L. A. CRIST.
DIRT, SAND, AND MANURE LOADER.
APPLICATION FILED MAR. 23, 1914.
1,156,889.
Patented Oct. 19, 1915.
3 SHEETS—SHEET 1.
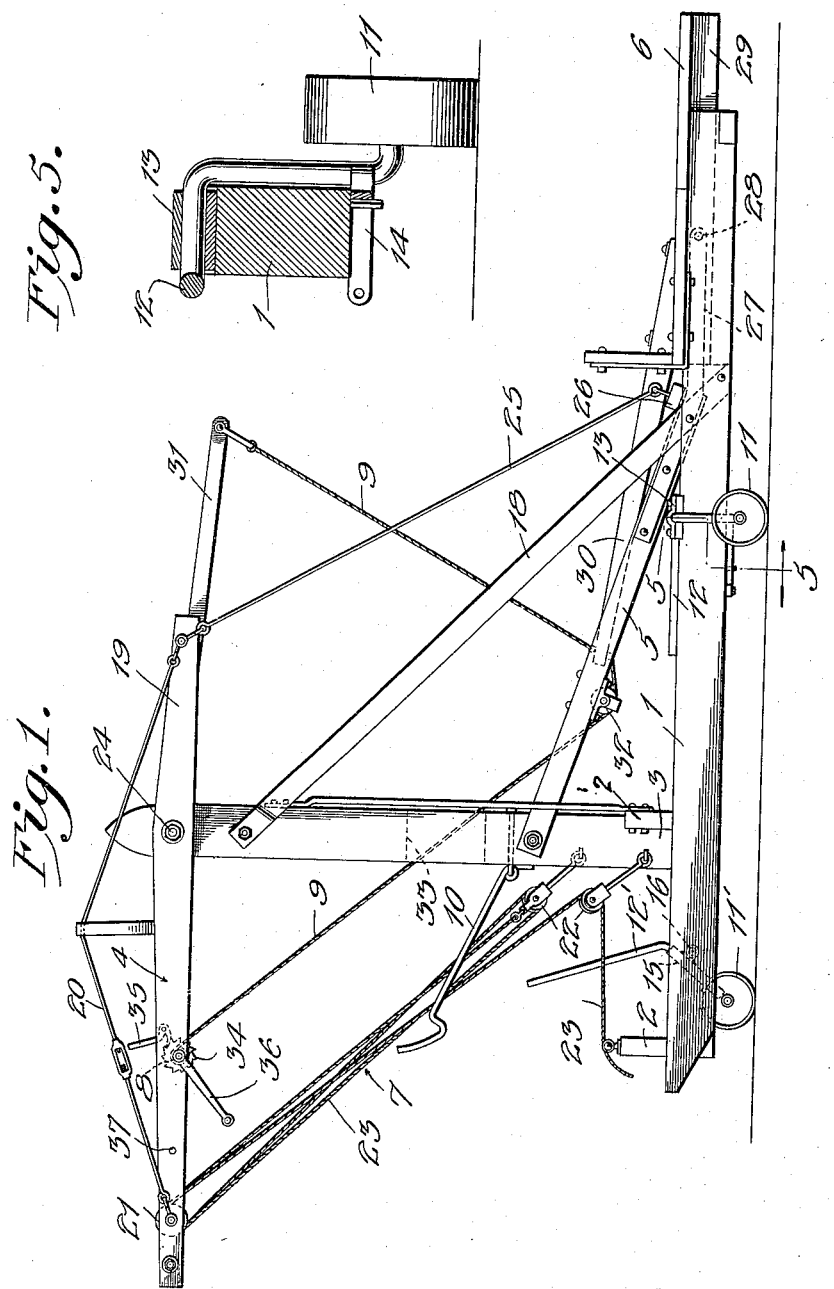
Witnesses
W. H. Rockwell
Inventor
L. A. Crist
By H. B. Willson & Co.
Attorneys

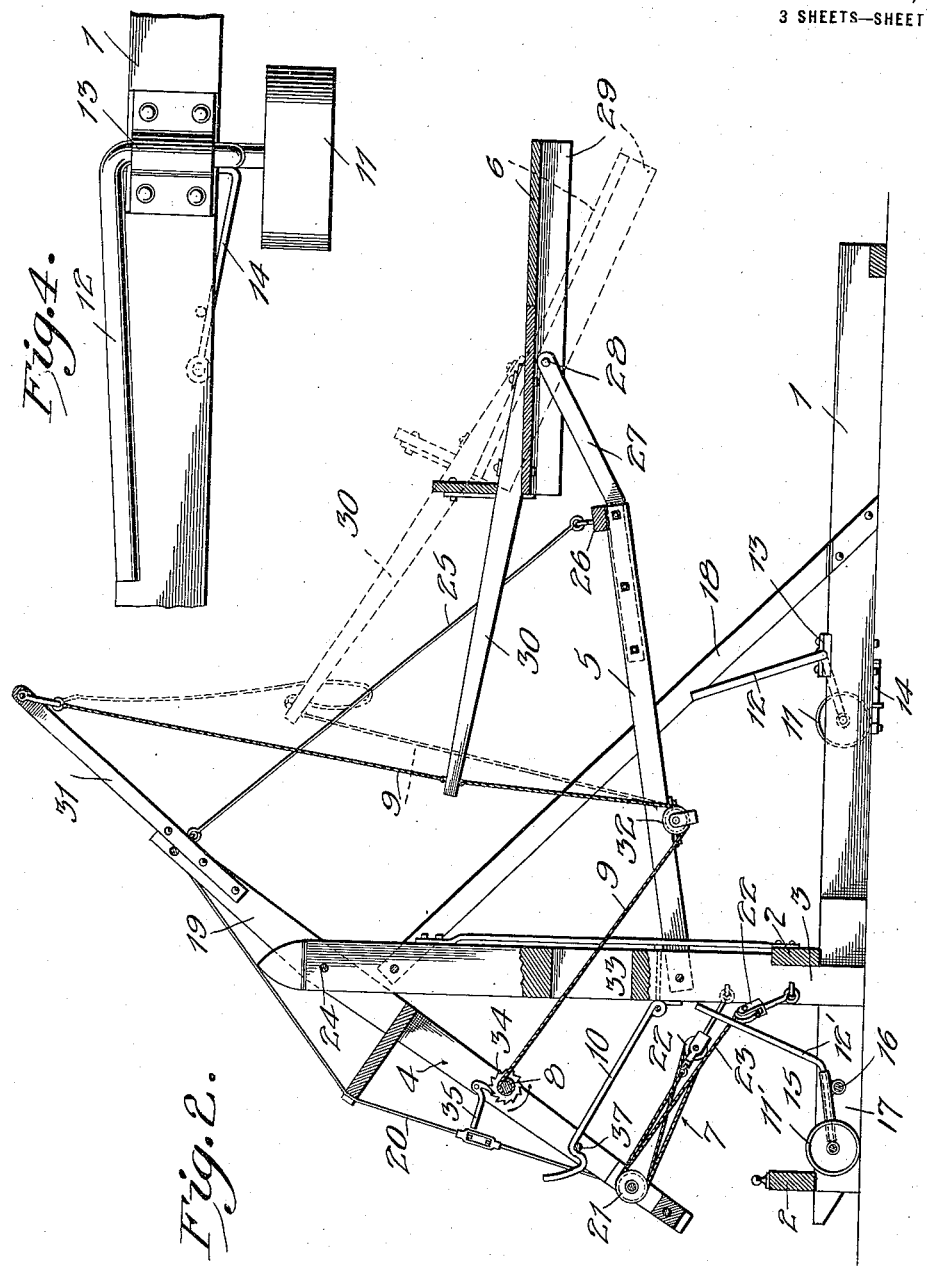

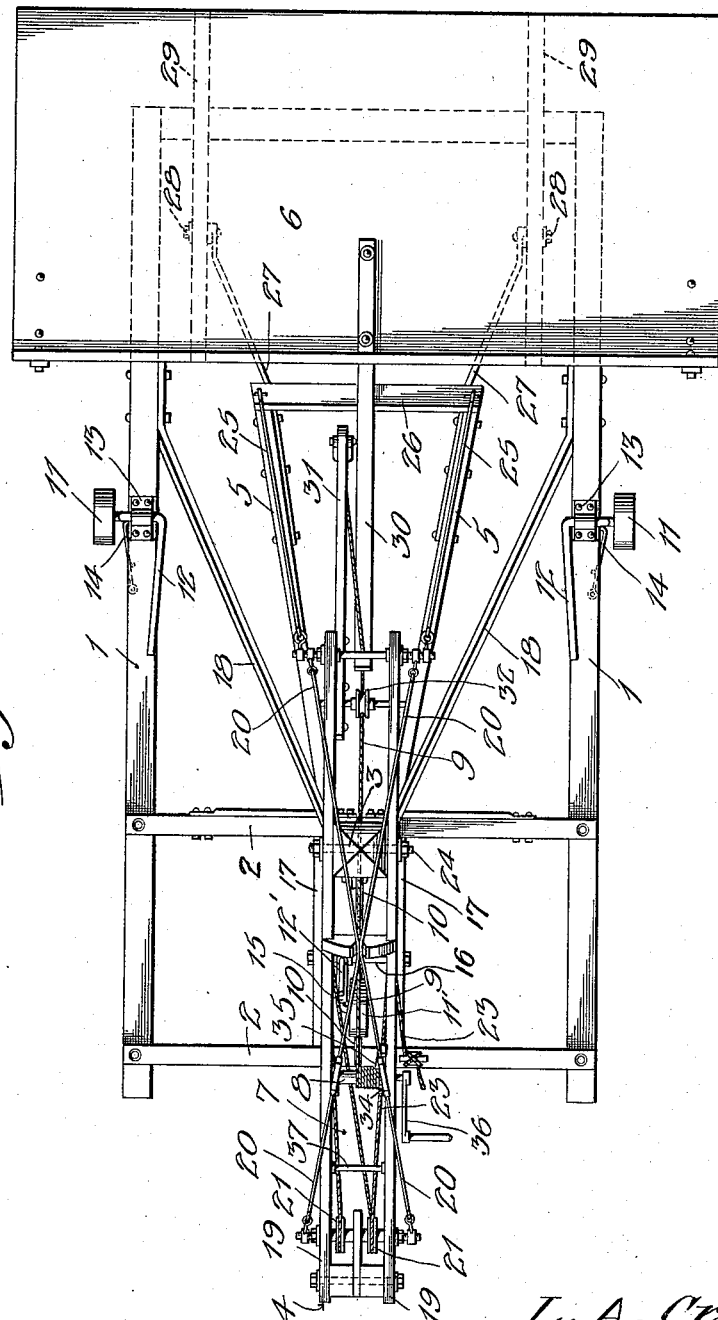

UNITED STATES PATENT OFFICE.

LAUREN A. CRIST, OF MARION, KANSAS.

DIRT, SAND, AND MANURE LOADER.

1,156,889.  Specification of Letters Patent.  Patented Oct. 19, 1915.

Application filed March 23, 1914. Serial No. 826,714.

*To all whom it may concern:*

Be it known that I, LAUREN A. CRIST, a citizen of the United States, residing at Marion, in the county of Marion and State of Kansas, have invented certain new and useful Improvements in Dirt, Sand, and Manure Loaders; and I do declare the following to be a full, clear, and exact description of the invention, such as will enable others skilled in the art to which it appertains to make and use the same.

My invention relates to improvements in loading devices and has for its primary object to provide a simple, strong and efficient device, of the herein described character, which may be employed to great advantage in raising any kind of material from a low to a high level, for any purpose whatsoever. In carrying out the invention, I provide a platform, mechanism for raising said platform, mechanism for retaining said platform in a horizontal position until it has been raised to the proper extent, means for locking said raising mechanism against movement, when the platform is raised to its greatest extent and means for allowing said platform to tilt for the purpose of discharging the material thereon.

A secondary object is to construct each of the above mentioned elements, in the most simple manner possible, consistent with the proper operation of the machine.

With the above and other minor objects in view, the invention resides in certain novel features of construction and combination herein described and claimed and shown in the drawing wherein—

Figure 1 is a side elevation of my improved loading machine, the platform being lowered. Fig. 2 is a vertical longitudinal section with the platform raised, the tilted position of said platform being shown in dotted lines; Fig. 3 is a plan view with the platform lowered; Fig. 4 is a detail top plan view showing the manner in which the supporting rollers are retained in operative position; and Fig. 5 is a vertical action on line 5—5 of Fig. 1.

In the accompanying drawings I have shown my invention as comprising, a pair of longitudinal base bars 1, connected near their rear ends by transverse bars 2, a post 3 rising from said bars, a lever 4 pivoted near the upper end of said post, a pair of forwardly diverging arms 5 pivoted at their rear ends near the lower end of said post and loosely connected to the forward end of said lever, a platform 6 pivotally supported upon the free ends of said arms, a block and tackle mechanism 7, for rocking said lever to raise said platform, a drum 8 mounted upon said lever 4, a flexible element or cable 9 for tilting said platform or retaining it in horizontal position, and a hook 10 for preventing retrograde movement of the lever 4, when said platform 6 is raised.

The base bars 1 may be of any suitable formation and are preferably provided with supporting rollers 11, said rollers being revolubly mounted upon the lower ends of levers 12, the latter having transverse portions which are rotatably mounted in bearings 13 upon the upper faces of said bars, the free ends of said levers being adapted to overlie said bars, when the rollers 11 are swung downwardly into operative position. For the purpose of preventing retrograde movement of the levers 12, I provide spring catches 14 which are carried by said bars 1 and are adapted to contact with the lower ends of the levers 12. Thus it will be seen that said levers are held rigidly in proper position to cause the rollers 11 to contact with the ground and thus support the bars 1 above the same. The rollers 11 are located near the forward ends of the bars 1, their rear ends being supported by a similar roller 11'. Said roller 11' is revolubly mounted upon the transversely turned lower end of a lever 12', the latter being of angular formation and revolubly mounted in a sleeve 15, said sleeve being rigidly secured to a transverse shaft 16 which has its opposite ends journaled in longitudinally extending bars 17, the latter being secured beneath the transverse bars 2 and to the opposite sides of the post 3, said post depending a suitable distance below the bars 2 as clearly shown in Fig. 2. By the provision of the rollers 11 and 11' and their mountings, it will be seen that the entire machine may be easily transported from place to place and that the lever 12' may be employed for shifting the axial relation of the roller 11' with the axes of the rollers 11, thereby steering the machine.

The post 3 may be of any suitable configuration and is preferably braced by downwardly and forwardly inclining bars 18 which are secured at their lower ends to the inner sides of the bars 1 while their upper ends are rigidly secured to said post. As before stated, the lever 4 is pivoted near the upper end of the post 3. Said lever is preferably constructed of a pair of longitudinal bars 19 which are spaced at their front and rear ends and are provided with suitable bracing or trussing rods 20, the rear ends of said bars 19 carrying a pair of pulleys 21, said pulleys constituting a portion of the block and tackle mechanism 7, the remaining parts of said mechanism being in the form of a pair of pulleys 22 loosely connected to the post 3, beneath the arms 5 and a cable 23 passing around said pulleys and extending laterally, said laterally extending portion being adapted for the purpose of applying power. As clearly shown in Figs. 1 and 2, the post 3 projects between the forward portions of the bars 19, said bars being pivoted thereto by a transverse pivot pin 24.

As before stated, the arms 5 diverge as they project forwardly, the forward ends of said arms being loosely connected with the forward end of the lever 4 by a pair of links 25, said links rising from the opposite ends of a transverse bar 26 which rigidly connects and spaces the forward ends of said arms 5. Extending forwardly from the arms 5 are rigid extensions 27 which have their outer ends pivoted as at 28 to longitudinal cleats 29 on the under side of the platform 6.

By the construction so far described, it will be seen that the arms 5 and the platform 6 will be raised when the rear end of the lever 4 is moved downwardly by the block and tackle mechanism 7. During this operation, it becomes expedient to provide means for retaining the platform 6 in horizontal position, until it has reached the proper height and for then allowing said platform to tilt. For this purpose, I have provided said platform with a rearwardly extending arm 30, said arm being rigidly connected to the cable 9, said cable being rigidly secured at one end to an arm 31 which projects forwardly from the lever 4 while its remaining portion is passed around a pulley 32 journaled between the arms 5 and then passes through a slot 33 in the post 3 and is wound a number of times around the drum 8, said drum being revolubly mounted between the bars 19 and in rear of the pivot pin 24. The drum 8 is provided with a ratchet 34, with a pawl 35 for coaction with said ratchet and with a crank 36 by which it may be rotated.

The hook 10 is preferably pivoted to the rear side of the post 3 in position to allow its bill to engage a transverse rod 37 which projects across the space between the bars 19. As before suggested, the hook 10 is provided for the purpose of preventing the rear end of the lever 6 from moving upwardly while the platform 6 is being tilted in a manner to be described.

The operation of the invention is as follows: The machine is moved upon its rollers, to the place where its operation is required. Here the rollers may be raised to allow the bars 1 to rest upon the ground thus forming an immovable support for the machine. The material to be raised, may now be placed upon the platform P in any suitable manner, preferably by the use of a scoop and the laterally extending end of the cable 23 may be pulled outwardly by any suitable means such as a drum or draft animal thus lowering the rear end of the lever 4 and raising the forward end thereof. The ascent of said forward end of the lever 4, will, through the action of the links 25, pull upwardly upon the arms 5 and consequently the platform 6 will be raised. During this operation, the proportioning of the various parts, will cause said platform to remain in a horizontal position. When the platform P has been raised sufficiently, the hook 10 will engage the transverse rod 37 and will prevent retrograde movement of the lever 6. The wagon, into which the material is to be loaded, may now be driven beneath the platform 6 after which the pawl 35 is released from its engagement with the ratchet 34, thus allowing the cable 9 to unwind from the drum 8. The unwinding of said cable 9 will allow the weight of the material upon the platform 6 to tilt the same to a sufficient extent to cause said material to be discharged from said platform into the wagon. The cable 9 may now be rewound upon the drum 8, the hook 10 disengaged from the rod 37 and the tension released from the end of the cable 23, thus allowing the platform 6 to assume its normal position near the ground.

From the foregoing description, taken in connection with the accompanying drawings, it will be seen that I have produced a very simple loading device which will be positive and efficient in its operation and which may be constructed at a minimum cost.

Various changes in form, proportion, character of materials and other minor details, may be resorted to without departing from the spirit of the invention as claimed.

Having thus described my invention, what I claim as new and desire to secure by Letters-Patent is:—

1. A loading device comprising a supporting structure, an arm pivoted thereto and projecting therefrom, a platform pivotally supported upon said arm, a lever pivoted intermediate its ends to said supporting structure above said arm, a connection between said lever and said arm, means for rocking said lever to raise said arm, an arm projecting from said platform to one side of its pivotal axis, a contact surface on the first mentioned arm, and a flexible element secured at its ends to said lever on opposite sides of its pivot and passing around said contact surface, the arm on said platform being connected to said element and one end of said element having a releasable connection with said lever.

2. A loading device comprising a supporting base, a post rising therefrom, an arm pivoted near the lower end of said post and projecting therefrom, a platform pivoted eccentrically upon the outer end of said arm, a lever pivoted intermediate its ends near the upper end of said post, a connection between one end of said lever and said arm, a guide on said arm, an arm projecting from said platform, a drum revolubly mounted on the opposite end of said lever, a cable secured at one end to said drum and at its opposite end to the portion of the lever on the opposite side of its pivot, said cable passing around said guide and being secured to the arm on said platform, and releasable means for locking said drum against rotation in one direction.

3. A loading device comprising a pair of spaced supporting bars, a post rising therefrom, a pair of forwardly projecting arms pivoted at their rear ends to the lower portion of said post, said arms having upturned forward extremities, a platform eccentrically pivoted to said upturned portions, an arm extending rearwardly from said platform, a pulley journaled between said first mentioned arms, a lever pivoted intermediate its ends to the upper portion of said post, connections between said first mentioned arms and the forward end of said lever, a manually operated drum on the rear portion of said lever, releasable means for preventing movement of said drum in one direction, a cable secured at its opposite ends to the forward end of said lever and said drum, said cable passing beneath said pulley and having a connection with the arm on said platform, and means for pulling the rear end of said lever downwardly to raise said platform.

4. In a loading device, a supporting post, a pair of upwardly swinging arms pivoted at their rear ends to opposite sides thereof, a cross bar connecting the forward ends of said arms, a platform pivoted on said arms, a lever comprising a pair of longitudinal bars pivoted on opposite sides of said post and spaced at their opposite ends, links depending from the forward ends of said bars and connected to said arms, a guide between said arms, a drum revoluble between the rear portions of said bars, releasable means for arresting movement thereof in one direction, and a cable secured at its opposite ends to said drum and the forward portion of said lever, said cable passing around said guide and having a connection with said platform for retaining the latter in a horizontal position until said releasable means is tripped.

In testimony whereof I have hereunto set my hand in presence of two subscribing witnesses.

LAUREN A. CRIST.

Witnesses:
H. M. THORP,
JAS. STEPHENSON.

Copies of this patent may be obtained for five cents each, by addressing the "Commissioner of Patents, Washington, D. C."